Patented Feb. 21, 1950

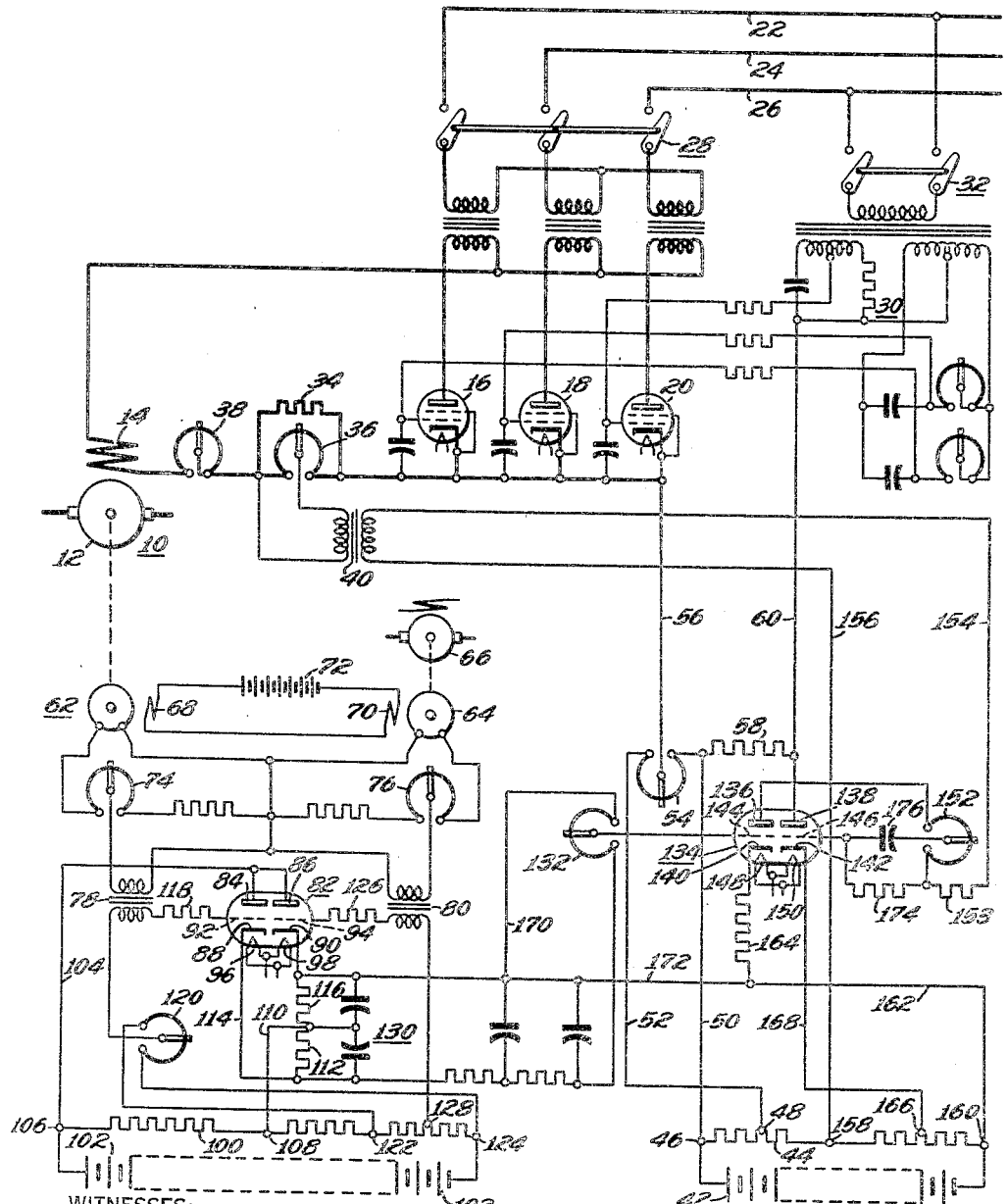

2,498,247

UNITED STATES PATENT OFFICE 2,498,247

SPEED REGULATING SYSTEM

Stephan L. Burgwin, East Aurora, and Joseph F. Kovalsky, Buffalo, N. Y., and Robert E. Hull, Pittsburgh, Pa., assignors to Westinghouse Electric Corporation, East Pittsburgh, Pa., a corporation of Pennsylvania Application October 30, 1947, Serial No. 783,100

14 Claims. (Cl. 318—317)

This invention relates to regulators and in particular to speed regulating systems of the electronic type.

In the making of paper, it is necessary to maintain predetermined speed of the driving motors and speed differences between the draw sections to produce a uniform quality of paper free from wrinkles, thin spots and the like. The regulator employed in maintaining speed must be sensitive and fast in operation without accompanying hunting. It has been difficult to accomplish such results with the mechanical regulators employed heretofore even when equipped with the complicated mechanical levers, gears and cone pulleys as is standard practice.

An object of this invention is the provision of an electronic speed regulator that is sensitive and fast in operation and free from hunting.

Another object of this invention is to provide a speed regulating system having an electronic regulator in which provision is made for anticipating corrective action while maintaining sensitivity.

A further object of this invention is to provide a speed regulating system in which an electronic regulator is operated in response to the unbalance between the voltage output from two alternating-current tachometers isolated from the regulator to prevent impedance effects therefrom being imposed on the regulator.

Other objects of this invention will become apparent from the following description when taken in conjunction with the accompanying drawing, the single figure of which is a diagrammatic view of a system and apparatus embodying the teachings of this invention.

Referring to the drawing, there is illustrated a motor 10, the speed of which is to be regulated. The motor 10 may be one of the drives of a paper mill or other apparatus in which the speed of the motor must be maintained at a predetermined value and comprises the armature windings 12 and the separately excited field windings 14. As illustrated, the field windings 14 are connected through a three-phase electronic rectifier formed of the valves 16, 18 and 20 to supply conductors 22, 24 and 26 by the three pole switch 28. A phase shifter 30 is connected to the grids of the valves 16, 18 and 20 and to supply conductors 22 and 26 by the double pole switch 32 for controlling the grid lag angle between the grids and anodes of the valves 16, 18 and 20 as in standard practice.

A parallel connected fixed resistor 34 and adjustable resistor 36 is connected in series circuit with another adjustable resistor 38 between one end of the field windings 14 and the cathodes of the rectifier valves 16, 18 and 20. The resistor 36 is connected to a damping transformer 40 for supplying a measure of the rate of change in the field excitation thereto, the purpose of which will be explained more fully hereinafter, and the resistor 38 is employed for making adjustments in the field excitation. The armature windings 12 of the motor 10 can be supplied in any suitable manner such as by a generator (not shown).

When the motor 10 is first started, it is desired that full excitation be provided. Thus in order to supply a maximum and predetermined positive direct-current biasing potential for the three phase rectifier valves 16, 18 and 20, provision is made for superimposing a direct-current biasing potential on the fixed phase shifted potential of the phase shifter 30. For this purpose, a source of direct-current energy, represented this instance by the battery 42, is provided and is connected across a sectionalized potentiometer 44. A section of the potentiometer 44 between terminal 46 and the tap 48 is connected by conductors 50 and 52, respectively, across an adjustable resistor 54, the adjustable contact arm of which is connected by conductor 56 to the cathodes of the rectifier valves 16, 18 and 20 and the fixed end terminal of which is connected through a fixed resistor 58 and conductor 60 to the phase shifter 30 and from thence to the grids of the rectifier valves 16, 18 and 20. Thus the adjustable resistor 54 is connected in the grid-cathode circuits of the rectifier valves to impress a positive direct-current biasing potential on the phase shifted alternating-current potential of sufficient value to render the valves 16, 18 and 20 conducting for a maximum period to provide full field excitation for the motor 10.

In order to provide for controlling the direct-current biasing potential impressed on the grids of the rectifier valves 16, 18 and 20 as the speed of the motor 10 varies, provision is made for balancing a "cue" voltage which is a measure of the speed of the motor 10 against a fixed "reference" voltage and for employing the unbalance therebetween to control the operation of an electronic amplifier, the output of which is impressed on the grid-cathode circuits of the rectifier valves 16, 18 and 20 in oposition to the positive direct-current biasing potential impressed thereon from the constant source represented by the resistor 54 supplied from the potentiometer 44.

In practicing this invention, alternating-current tachometers 62 and 64 are employed as sources of the "cue" voltage and the "reference"

voltage referred to hereinbefore. As illustrated, the tachometer 62 is disposed to be driven by the motor 10 so that the output of the tachometer generator 62 is a direct measure of the speed of motor 10. The tachometer generator 64 is driven by a direct-current motor 66 for providing the fixed reference voltage. The field windings 68 and 70 of the tachometer generators 62 and 64 are preferably connected in series circuit relation with a common source of direct-current power such as the battery 72 so that any variation in excitation of one is directly reflected in the excitation of the other tachometer generator.

The tachometer generators 62 and 70 are connected through adjustable resistors 74 and 76 respectively for supplying isolating transformers 78 and 80 respectively, connected in circuit relation for controlling the operation of a twin triode vacuum valve 82. The valve 82 is of the 6SN7 type being provided with a pair of anodes 84—86, a pair of cathodes 88—90, a pair of grids 92—94 and a pair of heater filaments 96—98, the latter being heated in any suitable manner. The respective pairs of anodes-cathodes are connected in circuit relation with a potentiometer resistor 100 which is connected to be supplied from a suitable source of power such as the battery 102. The anode-cathode circuits of the twin triode vacuum valve 82 thus extend from the anodes 84 and 86 through conductor 104, end terminal 106 of potentiometer resistor 100 to the fixed tap 108, conductor 110 and from thence through resistor section 112 and conductor 114 to cathode 88 and through resistor section 116 to cathode 90, respectively. The conductivity of the respective anode-cathode circuits of valve 82 thus determines the current flow through each of resistor sections 112 and 116.

In order to supply a direct-current biasing potential for the grid-cathode circuits of valve 82, a section of the potentiometer resistor 100 is also connected in the respective grid-cathode circuits. The output of the tachometer generators 62 and 64 as measured across the isolating transformers 78 and 80, respectively, is also utilized as the alternating-current biasing potential for the grids 92 and 94, respectively, to control the conductivity of the associated anode-cathode circuits of valve 82. Thus the grid-cathode circuit for the first section of valve 82 extends from the grid 92 through resistor 118, the secondary winding of isolating transformer 78, adjustable resistor 120, either tap 122 or 124 of potentiometer resistor 100 depending upon the adjustment of resistor 120, to tap 108 and from thence through conductor 110, resistor section 112 and conductor 114 to the cathode 88. Similarly, the grid-cathode circuit for the second section of the valve 82 extends from the grid 94 through resistor 126, the secondary winding of isolating transformer 80 to tap 128 of the potentiometer resistor 100, tap 108, conductor 110 and resistor section 116 to the cathode 90 of valve 82.

The output of the twin sections of valve 82 as measured across resistor section 112 is thus a direct measure of the "cue" voltage of the tachometer generator 62 which is a measure of the speed of the motor 10, whereas the output as measured across resistor section 116 is a measure of the "reference" voltage produced by the tachometer generator 64. Because of the presence of the isolating transformers 78 and 80, the sources of the "cue" and "reference" voltages have no impedance effects on the valve circuits.

By connecting the resistor sections 112 and 116 across a filter circuit 130 so that their polarities are opposing as illustrated, a net voltage which is a measure of unbalance between the "reference" voltage and the "cue" voltage is obtained across a resistor 132. Such unbalance as measured across resistor 132 is employed for controlling the operation of another twin triode vacuum valve 134 of the amplifier type 6SL7 and which is provided with anodes 136—138, cathode 140—142, grids 144—146 and heater filaments 148—150, the latter being connected to a source of supply (not shown).

The anode-cathode circuits of the two sections of valve 134 are connected in circuit relation with the source of direct-current power represented by the potentiometer resistor 44 referred to hereinbefore, the circuit for the first-anode-cathode section extending from the anode 136 through an adjustable resistor 152, resistor 153, conductor 154, the secondary winding of damping transformer 40, conductor 156, tap 158 of potentiometer resistor 44 to terminal 160 thereof, conductor 162 and resistor 164 to the cathode 140. The anode-cathode circuit of the second section may be traced from the anode 138, through resistor 58, conductor 50 to tap 46 of the potentiometer resistor 44 and tap 166 thereof and conductor 168 to the cathode 142.

The grid-cathode circuit for the first section of the valve 134 extends from the grid 144 through a part of the control resistor 132, conductors 170 and 172 and the self-biasing resistor 164 to the cathode 140. The grid-cathode circuit of the second section of the valve 134 extends from the grid 146 through resistors 174 and 153, conductor 154, the secondary winding of damping transformer 40, conductor 156 to tap 158 of the potentiometer resistor 158 and tap 166 thereof and conductor 168 to the cathode 142 of vacuum valve 134. Thus the bias of the second section grid 146 is controlled, not only by the direct-current bias impressed on the grid-cathode circuit by the source represented by the potentiometer resistor 44 but also by the potential across resistor 153 occasioned by the flow of current therethrough in the anode-cathode circuit of the first section of valve 134 and by any potential impressed on the circuit by reason of the damping transformer 40 which functions in a normal manner dependent upon a change in the excitation of the field winding 14 of the motor 10 in anticipation of a corrective action.

In the embodiment illustrated, a capacitor 176 is shown connected between the adjustable tap of resistor 152 and the resistor 174 to provide an alternate anode-cathode circuit for the first section of valve 134. This alternate circuit is employed for giving a fast biasing action for grid 146 of the second section under predetermined conditions of change in the balance between the reference voltage and the cue voltage referred to hereinbefore. Thus if the cue and reference voltages are in balance or if the change in the net balance impressed on the control resistor 132 is a slow steady change, then the normal output circuit of the first section of valve 134 by-passes the series connected capacitor 176 and resistor 174. However, if the change in balance between the cue and reference voltages is such as to be a measure of a rapid change in the speed of motor 10, then the output circuit of the first section of valve 134 employs the alternate path formed of the series connected capacitor 176 and resistor 174 to impress a large but momentary positive bias on the grid 146 to give a large momentary amplification to effect a large momentary corrective change in the excitation of the motor 10.

The resistor 58 of the anode-cathode circuit of the second section of valve 134 is connected in series circuit with the adjustable resistor 54 but is disposed to have a potential impressed thereon in opposition to the positive direct current potential across adjustable resistor 54. Thus the two series connected resistors 54 and 58 cooperate in controlling the positive direct-current biasing potential applied through the phase shifter 30 to the grids of rectifier valves 16, 18 and 20, depending upon the conductivity of the second section of valve 134, to control the conductivity of the rectifier valve 16, 18 and 20 and consequently the excitation of the field winding 14 of the motor 10. Thus any change in the conductivity of vacuum valve 134 is immediately reflected in the conductivity of the rectifier valves 16, 18 and 20 to effect an immediate change in the speed of the motor 10.

In operation, assuming that switches 28 and 32 are in circuit closing positions and that the heater filaments of the valves are energized, the motor 10 is operated at a predetermined speed depending upon the setting of adjustable resistors 38 and 54, the latter controlling the fixed or maximum direct-current biasing potential on the grids of the rectifier valves 16, 18 and 20. Assume that resistors 74 and 76 have been so adjusted that for a predetermined speed of the motor 10 which is to be maintained the "cue" voltage which is a measure of the speed and is impressed on the isolating transformer 78 is of equal value and in balance with the fixed "reference" voltage impressed on the isolating transformer 76.

Since the heater filaments of the valve 82 are energized, the twin sections of the valve 82 are rendered conducting depending upon the alternating-current biasing voltage impressed on the grids 92 and 94 by reason of the operation of the tachometer generators 62 and 64, respectively. If the "cue" voltage equals the "reference" voltage, then the first and second anode-cathode sections of valve 82 are substantially equally conducting with the result that the voltage drop across resistor 112 is of equal but opposite potential to that across resistor 116 and the net balance thereof is zero and a control voltage is, therefore, not impressed across resistor 132.

Under such conditions, the conductivity of the twin triode vacuum valve 134 is dependent upon the self-biasing action of resistor 164 and the direct-current biasing potential of the potentiometer resistor 44 connected in circuit with the grid 146 to produce a potential drop across resistor 58 in opposition to the fixed positive biasing potential across adjustable resistor 54 to control the conductivity of the rectifier valves 16, 18 and 20 in the supply circuit to the field winding 14 of the motor 10.

If for any reason the speed of the motor 10 should increase above the predetermined value which is to be maintained, then the alternating-current potential impressed on the isolating transformer 78 increases with respect to the substantially constant alternating-current reference voltage impressed on the isolating transformer 80 with the result that the first section of the valve 82 including the anode 84 and the cathode 88 is rendered more conducting than the second section including the anode 86 and the cathode 90. With such a change in conductivity of the first section of valve 82, the voltage across resistor 112 increases with respect to the voltage across resistor 116 so that when impressed on the filter circuit 130 as described hereinbefore, a net resulting voltage is measured across control resistor 132 of a polarity to give a negative biasing potential on the grid 144 of the first section of the vacuum valve 134.

The negative biasing potential thus obtained is a direct measure of the departure of the speed of the motor 10 from the predetermined speed and functions to render the first section of the valve 134 including the anode 136 and the cathode 140 less conductive whereby the current flowing through resistor 153 is decreased. Such decrease in current flowing through resistor 153 gives a less positive grid biasing potential thereacross in opposition to the negative grid bias from the section of the potentiometer resistor 44 connected between taps 158 and 166 whereby the negative bias on the grid 146 is increased to decrease the conductivity of the second section including anode 138 and cathode 142 of the vacuum valve 134. As the conductivity of the second section is thus decreased, the current flow through the resistor 58 in the second anode-cathode circuit is decreased to effect a decrease in the voltage across resistor 58 in opposition to the fixed positive biasing potential across the adjustable resistor 54 impressed thereon from the section of the potentiometer resistor 44 connected between tap 48 and terminal 46.

By reducing the voltage across resistor 58 in this manner, a more positive direct-current biasing potential is impressed on the grid-cathode circuits of the rectifier valves 16, 18 and 20 to effect an increase in the conductivity of the rectifying valves to supply more current to the field winding 14 of the motor 10 and thereby decrease the speed of the motor 10.

It will, of course, be appreciated that the damping transformer 40 connected in the grid-cathode circuit of the second section of valve 134 functions in the normal manner of a damping transformer so that as the field excitation of the field winding 14 is changed, a measure of the rate of change is impressed on the grid control circuit of the second section to modify the conductivity of the second anode-cathode circuit in anticipation of the changes effected to prevent over-adjustment in the excitation and consequently in the speed of the motor 10.

On the other hand if the change in the speed of the motor 10 should decrease below the predetermined value which is to be maintained, then the "cue" voltage impressed on isolating transformer 78 decreases with respect to the "reference" voltage impressed on the isolating transformer 80 and the first section of the valve 82 is rendered less conducting than the second section. This results in a smaller voltage across resistor 112 than the voltage measured across resistor 116 with the result that the voltage impressed on the control resistor 132 through the filter circuit 130 is of a polarity to give a positive biasing potential thereacross in opposition to the negative grid bias from the potentiometer resistor 44 to decrease the negative bias on the grid 146 and increase the conductivity of the second anode-cathode circuit of valve 134. The increase in the conductivity of the second anode-cathode circuit of valve 134 effects an increase in the flow of current through resistor 58 to effect an increase in the voltage thereacross in opposition to the fixed positive biasing potential from the potentiometer resistor 44.

By increasing the voltage across resistor 58 in this manner, a less positive direct-current biasing potential is impressed on the grid-cathode circuits of the rectifier valves 16, 18 and 20 to effect a decrease in the conductivity of the rectifying valves whereby the flow of current through the field windings 14 of the motor 10 is decreased to effect an increase in the speed of the motor 10.

If, instead of a normal deviation from the predetermined speed of the motor 10 which is to be maintained, there is a very rapid change in the speed, then the capacitor 176 and resistor 174 coupled in the anode-cathode circuit of the first section of valve 134 function to give a very rapid change in the grid bias of the second section in anticipation of the rapid change in the speed of the motor 10. Thus, for example, where the change in the speed of the motor 10 is a very rapid increase, the output of the first section of valve 134 is rapidly increased by reason of the change described hereinbefore in the bias of its grid 144 occasioned by the large and rapid unbalance between the "cue" voltage and the "reference" voltage. The resulting flow of current through the resistor 174 coupled in the anode-cathode circuit of the first section of valve 134 effects a large and rapid change in the grid bias of the second section of the valve 134 to thereby effectively and quickly change the bias of the rectifier valves 16, 18 and 20. This flow of current through the resistor 174 is caused by the charging of capacitor 176 as a result of the rapid increase in the flow of current in the anode-cathode circuit of the first section of valve 134.

The regulator and system of this invention are very efficient in operation, giving a fast and sensitive operation or regulating action. The system is quite stable in operation while retaining its sensitivity as the inclusion of the alternate path formed of the capacitor 176 and the resistor 174 and coupled in the anode-cathode circuit of the first section of valve 134 and the use of the damping transformer 40 the anode-cathode circuit of the first section for controlling the bias of the grid of the second section prevents hunting of the system either during normal operation or following some abnormal disturbance. By using high frequency alternating-current tachometer generators 62 and 64 to provide the "cue" and "reference" voltages as described and the associated isolating transformers 78 and 80, respectively, the electronic equipment of the regulator is free from any possible effects resulting from leakage currents, low frequency ripples from the power supply and stray magnetic fields in and around the apparatus with which the regulator is employed. Further, the system has the advantage that the failure of any one of the rectifier valves 16, 18 and 20 will not interrupt operation, whereas a failure of either of the valves 82 or 134 will cause a safe failure since no serious damage will result by reason of overspeeding or run away of the motor.

We claim as our invention:

1. In a system for regulating the speed of a dynamo-electric machine having a field winding, the combination comprising, means disposed for operation to control the field excitation of the dynamo-electric machine, a pair of vacuum valves each having twin anodes, cathodes, grids and heater filaments, a source of voltage constituting a predetermined reference voltage connected in circuit with one of the grids of one of the vacuum valves, another source of voltage constituting a measure of the speed of the dynamo-electric machine connected in circuit with the other grid of said one of the vacuum valves, said sources thereby controlling the conductivity of the associated anode-cathode circuits of said one of the vacuum valves, and means connected in circuit relation with the anode-cathode circuits of said one of the vacuum valves and with one of the grids of the other of the vacuum valves for providing a grid potential therefor that is a measure of unbalance between said sources, said grid potential controlling the conductivity of said other vacuum valve means to modify the operation of the control means to change the field excitation of the dynamo-electric machine in accordance with the measure of unbalance between said sources.

2. In a system for regulating the speed of a dynamo-electric machine having a field winding, the combination comprising, means disposed for operation to control the field excitation of the dynamo-electric machine, a pair of vacuum valves each having twin anodes, cathodes, grids and heater filaments, a source of voltage constituting a predetermined reference voltage connected in circuit with one of the grids of one of the vacuum valves, another source of voltage constituting a measure of the speed of the dynamo-electric machine connected in circuit with the other grid of said one of the vacuum valves, said sources thereby controlling the conductivity of the associated anode-cathode circuits of said one of the vacuum valves, means connected in circuit relation with the anode-cathode circuits of said one of the vacuum valves and with one of the grids of the other of the vacuum valves for providing a controlling grid bias therefor that is a measure of unbalance between said sources, the other grid of said other vacuum valve being connected in circuit relation with the anode-cathode circuit associated with said one grid to control the conductivity of the other anode-cathode circuit of said other vacuum valve, said other anode-cathode circuit of said other vacuum valve being connected to modify the operation of the control means to change the field excitation of the dynamo-electric machine in accordance with the measure of unbalance between said sources.

3. In a system for regulating the speed of a dynamo-electric machine having a field winding, the combination comprising, means disposed for operation to control the field excitation of the dynamo-electric machine, a pair of vacuum valve means, an alternating-current tachometer disposed to be operated to provide a predetermined reference voltage, another alternating current tachometer disposed to be operated by the dynamo-electric machine to provide a voltage that is a measure of the speed of the dynamo-electric machine, one of the pair of valve means being responsive to said voltages to provide a control voltage that is a measure of unbalance between said voltages, the other of the pair of valve means being connected to be responsive to said control voltage to modify the operation of the control means to change the field excitation of the dynamo-electric machine in accordance with the measure of unbalance between said sources.

4. In a system for regulating the speed of a dynamo-electric machine having a field winding, the combination comprising, means disposed for operation to control the field excitation of the dynamo-electric machine, a pair of vacuum valves each having twin anodes, cathodes and grids, an alternating-current tachometer disposed to be operated to provide a predetermined reference voltage, another alternating-current tachometer disposed to be operated by the dynamo-electric machine to provide a voltage that is a measure of the speed of the dynamo-electric machine, one of the grids of one of the vacuum valves being connected in circuit relation with the reference voltage to control the conductivity of the associated anode-cathode circuit thereof, the other grid of said one of the vacuum valves being connected in circuit relation with the speed measuring voltage to control the conductivity of the associated anode-cathode circuit thereof, isolating transformers connected between said voltages and associated grids to prevent the valve circuits from being affected by the impedance of the tachometer circuits, means connected in circuit relation between the anode-cathode circuits of said one of the vacuum valves and one of the grids of the other vacuum valve for providing a control voltage therefor that is a measure of unbalance between said reference voltage and said speed measuring voltage, said control voltage controlling the conductivity of said other vacuum valve to modify the operation of the control means to change the field excitation of the dynamo-electric machine in accordance with the measure of unbalance between said sources.

5. In a system for regulating the speed of a dynamo-electric machine having a field winding, the combination comprising, means disposed for operation to control the field excitation of the dynamo-electric machine, a pair of vacuum valves each having twin anodes, cathodes and grids, an alternating-current tachometer disposed to be operated to provide a predetermined reference voltage, another alternating-current tachometer disposed to be operated by the dynamo-electric machine to provide a voltage that is a measure of the speed of the dynamo-electric machine, one of the grids of one of the vacuum valves being connected in circuit relation with the reference voltage to control the conductivity of the associated anode-cathode circuit thereof, the other grid of said one of the vacuum valves being connected in circuit relation with the speed measuring voltage to control the conductivity of the associated anode-cathode circuit thereof, isolating transformers connected between said voltages and associated grids to prevent the valve circuits from being affected by the impedance of the tachometer circuits, means connected in circuit relation between the anode-cathode circuits of said one of the vacuum valves and one of the grids of the other vacuum valve for providing a control voltage therefor that is a measure of unbalance between said reference voltage and said speed measuring voltage, the other grid of said other vacuum valve being connected in circuit relation with the anode-cathode circuit associated with said one grid to control the conductivity of the other anode-cathode circuit of said other vacuum valve, said other anode-cathode circuit of said other vacuum valve being connected to modify the operation of the control means to change the field excitation of the dynamo-electric machine in accordance with the measure of unbalance between said reference voltage and said speed measuring voltage.

6. In a system for regulating the speed of a dynamo-electric machine having a field winding, the combination comprising, means disposed for operation to control the field excitation of the dynamo-electric machine, a pair of vacuum valves each having twin anodes, cathodes and grids, an alternating-current tachometer disposed to be operated to provide a predetermined reference voltage, another alternating-current tachometer disposed to be operated by the dynamo-electric machine to provide a voltage that is a measure of the speed of the dynamo-electric machine, one of the grids of one of the vacuum valves being connected in circuit relation with the reference voltage to control the conductivity of the associated anode-cathode circuit thereof, the other grid of said one of the vacuum valves being connected in circuit relation with the speed measuring voltage to control the conductivity of the associated anode-cathode circuit thereof, isolating transformers connected between said voltages and associated grids to prevent the valve circuits from being affected by the impedance of the tachometer circuits, means connected in circuit relation between the anode-cathode circuits of said one of the vacuum valves and one of the grids of the other vacuum valve for providing a control voltage therefor that is a measure of unbalance between said reference voltage and said speed measuring voltage, the other grid of said other vacuum valve being connected in circuit relation with the anode-cathode circuit associated with said one grid to control the conductivity of the other anode-cathode circuit of said other vacuum valve, said other anode-cathode circuit of said other vacuum valve being connected to modify the operation of the control means to change the field excitation of the dynamo-electric machine in accordance with the measure of unbalance between said reference voltage and said speed measuring voltage, and a damping transformer connected in circuit relation with said other grid of said other valve and the field winding of the dynamo-electric machine for impressing a potential that is a measure of the rate of change in the field excitation on said other grid for modifying the control of said other anode-cathode circuit of said other vacuum valve.

7. In an electronic regulator for maintaining the speed of a dynamo-electric machine having a field winding substantially constant, in combination, an electronic rectifier disposed for operation to supply the field excitation of the dynamo-electric machine, a source of voltage constituting a predetermined reference voltage, another source of voltage constituting a measure of the speed of the dynamo-electric machine, a vacuum valve having twin anodes, cathodes and grids, one of the grids of the vacuum valve being connected in circuit relation with the reference voltage to control the conductivity of the associated anode-cathode circuit thereof, the other grid of the vacuum valve being connected in circuit relation with the speed measuring voltage to control the conductivity of the associated anode-cathode circuit thereof, another vacuum valve having twin anodes, cathodes and grids, means connected between said anode-cathode circuits and one of the grids of said other vacuum valve dependent upon the conductivity of said anode-cathode circuits to provide a control grid biasing voltage that is a measure of unbalance between the reference voltage and the speed measuring voltage, the other grid of said other vacuum valve being connected in circuit relation with the anode-cathode circuit associated with said one of the grids to control the conductivity of the other anode-cathode circuit of said other vacuum valve, said other anode-cathode circuit being connected to the electronic rectifier to modify the operation thereof to control the field excitation in accordance with the unbalance between the reference voltage and the speed measuring voltage.

8. In an electronic regulator for maintaining the speed of a motor having a field winding substantially constant, in combination, an electronic rectifier disposed for operation to supply the field excitation of the motor, a source of power for supplying a predetermined positive direct-current biasing potential to control the operation of the electronic rectifier to supply maximum field excitation of the motor, a pair of vacuum valves each of which is provided with twin anodes, cathodes and grids, a source of voltage constituting a predetermined reference voltage, another source of voltage constituting a measure of the speed of the motor, one of the valves having the twin grids thereof connected in circuit relation with said sources of voltage to control the conductivity of the associated anode-cathode circuits, means connected in circuit relation with said anode-cathode circuits of said one valve and with one of the grids of said other vacuum valve to provide a control biasing potential for said one grid that is a measure of the unbalance between said source of voltage, means connected in the first anode-cathode circuit controlled by said one grid for impressing a control potential on the other grid of said other valve to control the conductivity of the second anode-cathode circuit of said other valve, and means connected in circuit relation with said second anode-cathode circuit and the predetermined positive biasing potential for the electronic rectifier responsive to the conductivity of said second anode-cathode circuit for modifying the bias applied to the rectifier to control the field excitation of the motor in accordance with the unbalance between said sources of voltage.

9. In an electronic regulator for maintaining the speed of a motor having a field winding substantially constant, in combination, an electronic rectifier disposed for operation to supply the field excitation of the motor, a source of power for supplying a predetermined positive direct-current biasing potential to control the operation of the electronic rectifier to supply maximum field excitation of the motor, a pair of vacuum valves each of which is provided with twin anodes, cathodes and grids, a source of voltage constituting a predetermined reference voltage, another source of voltage constituting a measure of the speed of the motor, one of the valves having the twin grids thereof connected in circuit relation with said sources of voltage to control the conductivity of the associated anode-cathode circuits, means connected in circuit relation with said anode-cathode circuits of said one valve and with one of the grids of said other vacuum valve to provide a control biasing potential for said one grid that is a measure of the unbalance between said sources of voltage, means connected in the first anode-cathode circuit controlled by said one grid for impressing a control potential on the other grid of said other valve to control the conductivity of the second anode-cathode circuit of said other valve, means connected in circuit relation with said second anode-cathode circuit and the predetermined positive biasing potential for the electronic rectifier responsive to the conductivity of said second anode-cathode circuit for modifying the bias applied to the rectifier to control the field excitation of the motor in accordance with the unbalance between said sources of voltage, and a damping transformer connected in circuit relation with said other grid of said other valve and the field winding of the motor for impressing a potential that is a measure of the rate of change in the field excitation on said other grid for modifying the conductivity of said second anode-cathode circuit.

10. In a regulating system for maintaining the speed of a motor having a field winding substantially constant, in combination, an electronic rectifier disposed for operation to supply the field excitation of the motor, a source of power for supplying a predetermined positive direct-current biasing potential to control the operation of the electronic rectifier to supply maximum field excitation of the motor, a pair of vacuum valves each of which is provided with twin anodes, cathodes and grids, an alternating-current tachometer disposed to be operated to provide a predetermined reference voltage, another alternating-current tachometer disposed to be operated in accordance with the speed of the motor to provide a voltage that is a measure of the speed, isolating transformers connected in circuit between said tachometers and the twin grids of one of said valves thereby to control the conductivity of the twin anode-cathode circuits thereof, means connected in circuit relation between said twin anode-cathode circuits of said one valve and one of the twin grids of said other valve responsive to the conductivity of said twin anode-cathode circuits for providing a biasing potential that is a measure of unbalance between the reference voltage and the speed measuring voltage to control the conductivity of the first anode-cathode circuit of said other valve, means connected in circuit relation with said first anode-cathode circuit and with the other twin grid of said other valve responsive to the conductivity of said first anode-cathode circuit for impressing a biasing control potential on said other grid to control the conductivity of the second anode-cathode circuit of said other valve, and means responsive to the conductivity of said second anode-cathode circuit connected in circuit relation with said predetermined positive biasing potential for the electronic rectifier for modifying the positive bias applied to the rectifier to control the field excitation of the motor in accordance with the unbalance between said reference voltage and said speed measuring voltage.

11. In a regulating system for controlling the operation of a dynamo-electric machine, the combination comprising, means disposed for operation to control the operation of the dynamo-electric machine, a pair of vacuum valves each having twin anodes, cathodes, grids and heater filaments, a source of voltage constituting a predetermined reference voltage connected in circuit with one of the grids of one of the vacuum valves, another source of voltage constituting a measure of the speed of the dynamo-electric machine connected in circuit with the other grid of said one of the vacuum valves, said sources thereby controlling the conductivity of the associated anode-cathode circuits of said one of the vacuum valves, and means connected in circuit relation with the anode-cathode circuits of said one of the vacuum valves and with one of the grids of the other of the vacuum valves for providing a grid potential therefor that is a measure of unbalance between said sources, said grid potential controlling the conductivity of said other vacuum valve means to modify the operation of the control means to change the operation of the dynamo-electric machine in accordance with the measure of unbalance between said sources.

12. In a system for regulating the operation of a dynamo-electric machine, the combination comprising, means disposed for operation to control the operation of the dynamo-electric machine, a pair of vacuum valves each having twin anodes, cathodes, grids and heater filaments, a source of voltage constituting a predetermined reference voltage connected in circuit with one of the grids of one of the vacuum valves, another source of voltage constituting a measure of the speed of the dynamo-electric machine connected in circuit with the other grid of said one of the vacuum valves, said sources thereby controlling the conductivity of the associated anode-cathode circuits of said one of the vacuum valves, means connected in circuit relation with the anode-cathode circuits of said one of the vacuum valves and with one of the grids of the other of the vacuum valves for providing a controlling grid bias therefor that is a measure of unbalance between said sources, the other grid of said other vacuum valve being connected in circuit relation with the anode-cathode circuit associated with said one grid to control the conductivity of the other anode-cathode circuit of said other vacuum valve, said other anode-cathode circuit of said other vacuum valve being connected to modify the operation of the control means to change the operation of the dynamo-electric machine in accordance with the measure of unbalance between said sources.

13. In a system for regulating the operation of a dynamo-electric machine, the combination comprising, means disposed for operation to control the operation of the dynamo-electric machine, a pair of vacuum valve means, an alternating-current tachometer disposed to be operated to provide a predetermined reference voltage, another alternating current tachometer disposed to be operated by the dynamo-electric machine to provide a voltage that is a measure of the speed of the dynamo-electric machine, one of the pair of valve means being responsive to said voltages to provide a control voltage that is a measure of unbalance between said voltages, the other of the pair of valve means being connected to be responsive to said control voltage to modify the operation of the control means to change the operation of the dynamo-electric machine in accordance with the measure of unbalance between said sources.

14. In a system for regulating the operation of a dynamo-electric machine, the combination comprising, means disposed for operation to control the operation of the dynamo-electric machine, a pair of vacuum valve means, an alternating-current tachometer disposed to be operated to provide a predetermined reference voltage, another alternating current tachometer disposed to be operated by the dynamo-electric machine to provide a voltage that is a measure of the speed of the dynamo-electric machine, one of the pair of valve means being responsive to said voltages to provide a control voltage that is a measure of unbalance between said voltages, the other of the pair of valve means being connected to be responsive to said control voltage to modify the operation of the control means to change the operation of the dynamo-electric machine in accordance with the measure of unbalance between said sources, and a damping transformer connected in circuit relation with said other of the pair of valve means and the dynamo-electric machine for impressing a potential that is a measure of the rate of change of an operating characteristic of the dynamo-electric machine on said other of the pair of valve means for modifying the response thereof to said control voltage to stabilize operation of the dynamo-electric machine.

STEPHAN L. BURGWIN.
JOSEPH F. KOVALSKY.
ROBERT E. HULL.

REFERENCES CITED

The following references are of record in the file of this patent:

UNITED STATES PATENTS

| Number | Name | Date |
|---|---|---|
| 2,421,632 | Livingston | June 3, 1947 |